United States Patent [19]

Mallinson et al.

[11] Patent Number: 5,042,943
[45] Date of Patent: Aug. 27, 1991

[54] ENDFACE ASSESSMENT

[75] Inventors: Stephen R. Mallinson, Ipswich; Stephen Hornung, Fressingfield, both of England; Jonathan S. Harper, Melbourne, Australia

[73] Assignee: British Telecommunications Public Limited Company, England

[21] Appl. No.: 488,029
[22] PCT Filed: Dec. 22, 1988
[86] PCT No.: PCT/GB88/01117
  § 371 Date: May 17, 1990
  § 102(e) Date: May 17, 1990
[87] PCT Pub. No.: WO89/05958
  PCT Pub. Date: Jun. 29, 1989

[30] Foreign Application Priority Data

Dec. 23, 1987 [GB] United Kingdom .................. 8729951

[51] Int. Cl.$^5$ ...................... G01N 21/84; G01B 11/26
[52] U.S. Cl. .................................................... 356/73.1
[58] Field of Search ....................................... 356/73.1

[56] References Cited

U.S. PATENT DOCUMENTS 4,652,123 3/1987 Neumann ......................... 356/73.1

FOREIGN PATENT DOCUMENTS 57-125037 7/1984 Japan .................................. 356/73.1
189595 10/1987 United Kingdom ................ 356/73.1

OTHER PUBLICATIONS

Proceedings of the IEEE, vol. 70, No. 6, Jun. 1982, pp. 683-684, New York, US; K. Iizuka: "Acoustic Time-Domain Reflectometer Used as a Short-Range Fiber-Optic Fault Locator".
Electronic Letters, vol. 20, No. 13, Jun. 1984, pp. 528-530, Stains, Middlesex, GB; C. A. Millar: "Simplified Optical Fibre End-Cleave Angle Measurement Device".
Patent Abstracts of Japan, vol. 9, No. 281 (P-403) [2004], 8th Nov. 1985; JP-A-60 122 347 (Nippon Denshin Denwa Kosha) 29-06-1985.
Patent Abstracts of Japan, vol. 9, No. 174 (P-374) [1897], 19th Jul. 1985; and JP-A-60 49 239 (Nippon Denshin Denwa Kosha) 18-03-1985.
Electronics International, vol. 55, No. 9, May 1982, p. 159, New York US; J. T. Harvey et al.: "Building a Low-Cost Optical Time-Domain Reflectometer".—Whole Document.

Primary Examiner—Vincent P. McGraw
Attorney, Agent, or Firm—Nixon & Vanderhye

[57] ABSTRACT

Apparatus for measuring the endface angle of a cleaved optical fibre (1) includes a light source (3) for injecting optical energy into that end (1a) of the optical fibre (1) opposite to that whose endface angle is to be measured. Means are provided for tapping optical energy passing along the optical fiber (1) in both directions. Photodetectors (5,6) measure the signal strength of the optical energy tapped from the optical fibre (1) in both directions. The ratio of these measured signal strengths is compared with a known relationship between endface angles and the ratio of said measured signals to provide a measure of the endface angle.

10 Claims, 2 Drawing Sheets

ENDFACE ASSESSMENT

This invention relates to the assessment of the endfaces of dielectric members, and in particular to the measurement of cleaved optical fibre endface angles. Throughout this specification, the term endface angle should be taken to means the angle between the endface of an optical fibre and the plane perpendicular to the axis of the fibre.

The quality of the endface of an optical fibre can be highly important, particularly in fusion splicing of fibres, and in terminating coupler arrays and devices. In the former case, it is important for the cleaved endface of an optical fibre to be substantially perpendicular to the axis of the fibre, since a non-perpendicular endface can introduce serious misalignment at a fibre splice. Also when terminating a coupler array, it is important that the cleaved endface lies at a sufficiently large angle to the fibre axis to prevent substantially all back-reflection (to avoid cross-talk in duplex systems for example).

Fibre endfaces are commonly produced by cleaving, using dedicated cleaving apparatus. A known method of assessing the quality of a fibre end, particularly in terms of the endface angle, relies on the combination of the angle of reflection of light at the endface and diffraction. This method is described in the following paper: "A measurement technique for optical fibre break angles", C. A. Millar, Opt. Quant., 13 pp 125–131 (1981). A modification of this method is described in European Patent Specification No. 167269.

The main disadvantage of known methods utilising diffraction techniques is that they are difficult to do, and need considerable skill to achieve acceptable results. They are, therefore, not particularly suitable for fields use, where the operator often does not have the requisite skills.

The aim of the invention is to provide an improved method of, and apparatus for, measuring the endface angle of an optical fibre. In particular, the invention aims to provide means for measuring the endface angle of an optical fibre that requires little skill to use, and so can be carried out by normal field operators.

The present invention provides apparatus for measuring the endface angle of a cleaved optical fibre, the apparatus comprising a light source for injecting optical energy into that end of an optical fibre opposite to that whose endface angle is to be measured, means for tapping optical energy passing along the optical fibre in both directions, and means for measuring the signal strength of the optical energy tapped from the optical fibre in both directions, whereby the ratio of said measured signal strengths can be compared with a known relationship between endface angles and the ratio of said measured signals to provide a measure of the endface angle.

In a preferred embodiment, the tapping means is constituted by a pick-up element defining a curved optical waveguiding path, and clamping means for clamping the optical fibre into a curved position which at least substantially conforms to the inner side of the curved path, such that optical energy passing along the optical fibre in both directions is tapped into the curved optical waveguiding path. Advantageously, the pick-up element has a curved portion joining two straight portions, the curved portion defining the curved optical waveguiding path, and the straight portions constituting straight waveguiding paths for directing tapped optical energy to said signal strength measuring means.

Preferably, the signal strength measuring means is constituted by first and second photodetectors, the first photodetector being arranged to measure the signal strength of the optical energy tapped from the optical fibre in one direction, and the second photodetector being arranged to measure the signal strength of the optical energy tapped from the optical fibre in the other direction. Conveniently, the first and second photodetectors are positioned at the free ends of the two straight portions of the pick-up element.

The invention also provides an endface angle measuring apparatus in combination with a cleaving tool, the endface angle measuring apparatus being as defined above, the cleaving tool having a clamp for clamping the optical fibre, and the tapping means and the measuring means being associated with the cleaving tool to form a single constructional unit.

The invention further provides a method of measuring the endface angle of a cleaved optical fibre, the method comprising the steps of injecting optical energy into that end of the optical fibre opposite to the cleaved end whose endface angle is to be measured, tapping and measuring the signal strength of optical energy passing along the optical fibre towards said cleaved end, tapping and measuring the signal strength of optical energy passing along the optical fibre away from said cleaved end and after reflection at its endface, and comparing the ratio of the said measured signal strengths with a known relationship between endface angles and the said measured signals to provide a measure of the endface angle.

One form of endface angle measuring apparatus constructed in accordance with the invention will now be described, by way of example, with reference to the accompanying drawings, in which.

Figure 1:
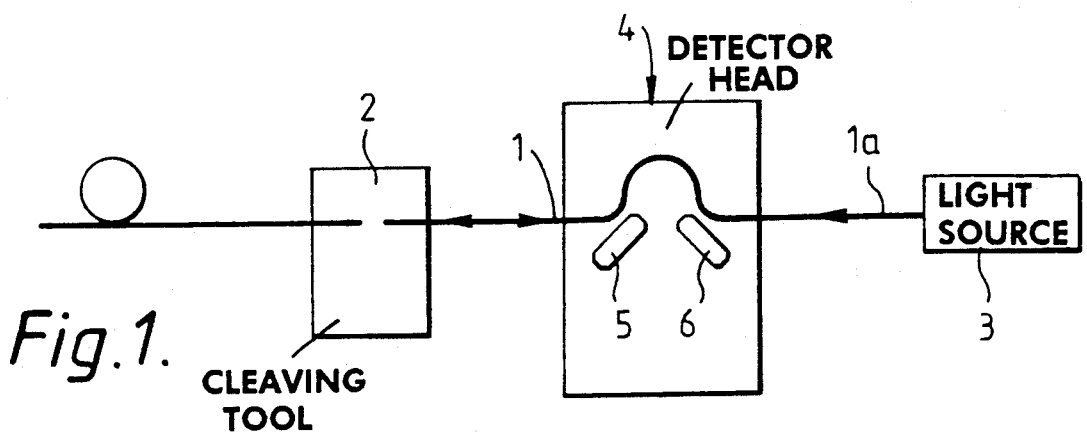
FIG. 1 is a schematic plan view of the apparatus.

Referring to the drawings, FIG. 1 shows an optical fibre 1 clamped to a cleaving tool 2. The free end 1a of the optical fibre is attached to a light source 3, which can be either a laser or a LED. A clip-on detector head, indicated generally by the reference numeral 4, is positioned between the cleaving tool 2 and the light source 3. The detector head 4 is able separately to tap and measure optical energy propagating in both directions in the fibre 1. The detector head 4 includes an optical coupling device which is preferably of the type described in the specification of our co-pending British patent application No. 8706929, the contents of which are incorporated herein by way of reference.

Such an optical coupling device comprises a silica rod 10 having a curved portion between two straight portions, and a curved block 11 which co-operate to clamp the optical fibre 1 against the inner surface of the curved portion of the silica rod. Photodetectors 5 and 6 are associated with the free end portions of the two straight portions of the silica rod, so that optical energy which leaks out of the optical fibre 1 at the curved portion thereof is picked up by the silica rod and guided to one of the photodetectors. The photodetector 5 detects tapped optical energy passing along the optical fibre 1 in one direction, and the other photodetector 6 detects tapped optical energy passing along the optical fibre in the opposite direction.

Figure 3:
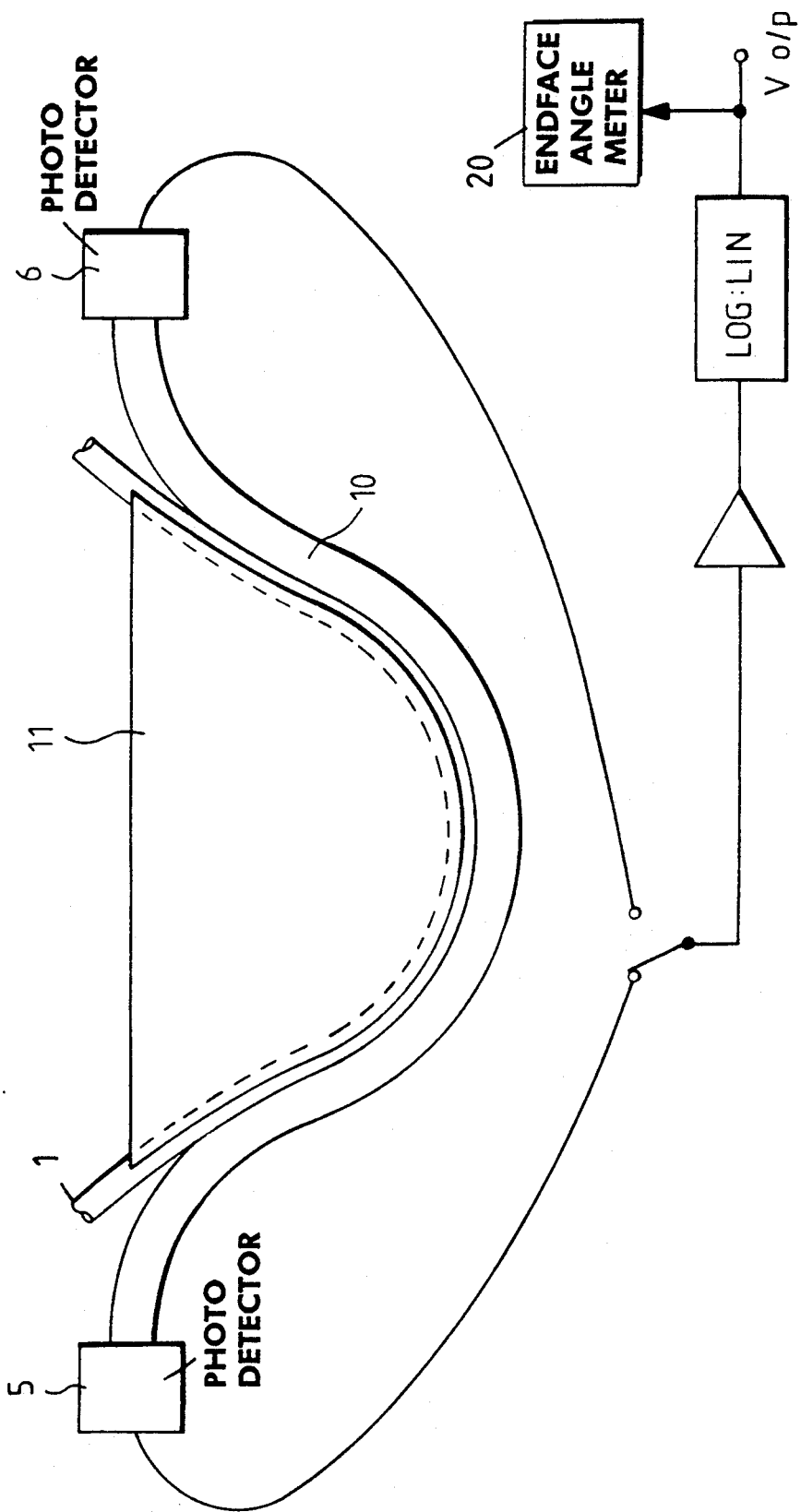
FIG. 3 is a schematic representation of the detector head arrangement.

Associated with the detectors are electronics consisting of a preamplifier, the output of which is fed into a log to linear convertor, producing a linear output voltage corresponding to the fibre core power, which can be calibrated in dBm. Preferably, rather than having a separate circuit for each detector, a single circuit is used with the two detectors being switched to the preamplifier input, as shown in FIG. 3, thus avoiding possible inaccuracies due to imbalance in a dual circuit system.

When the optical fibre 1 is cleaved by the tool 2, a small proportion of the light travelling from right to left is reflected by the cleaved end, and is detected by the photodetector 6, this proportion of reflected light being dependent upon the endface angle of the cleaved end.

Figure 2:
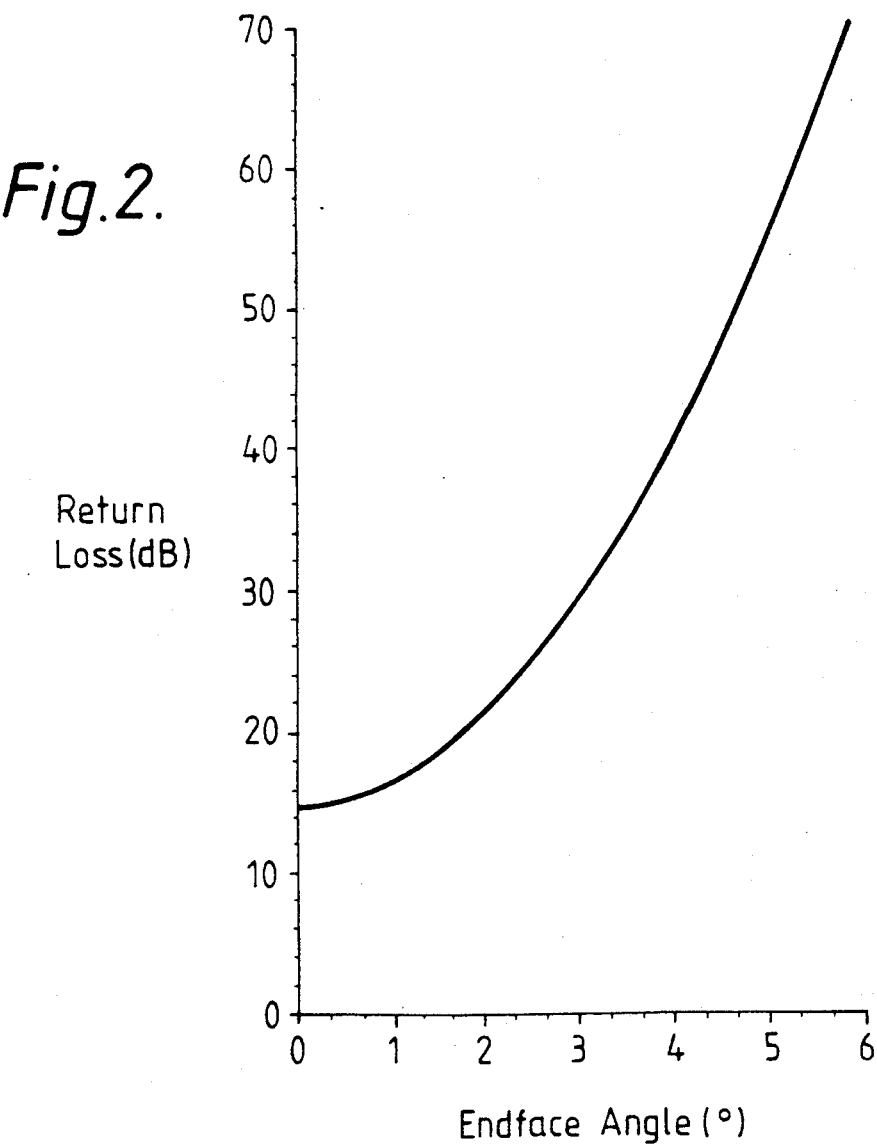
FIG. 2 is a graph showing the relationship between endface angle and the return loss for an unmatched optical fibre.

The photodetector 5 is used to measure the optical energy propagated into the optical fibre 1 by the light source 3. The ratio of the signals measured by the photodetectors 5 and 6 then gives a measure of the return loss in the fibre 1, and this bears a relationship with the endface angle 1. This relationship is illustrated in FIG. 2, which is a graph plotting return loss (in dB) against endface angle. The directly measured return loss is increased by the insertion loss of the device, and consequently the insertion loss value must be substracted from the measured return loss to give the actual return loss. The following table shows the relationship between cleave angle and return loss:

| Cleave Angle (degrees) | Measured Return Loss (dB) | Corrected* Return Loss (dB) |
| --- | --- | --- |
| 0.2 | 18.72 | 14.03 |
| 0.3 | 19.02 | 14.33 |
| 0.4 | 19.77 | 15.08 |
| 1.0 | 20.74 | 16.05 |
| 1.2 | 21.68 | 16.99 |
| 1.3 | 22.4 | 17.71 |
| 1.4 | 22.93 | 18.24 |
| 1.6 | 22.95 | 18.26 |
| 1.9 | 25.4 | 20.71 |

*insertion loss in this example = 4.69 dB.

The bend radius of the waveguide described in our previously mentioned British patent application No. 8706929 was set to give an insertion loss in the fibre under test of about 3 dB, but the actual insertion loss is a function of the bend sensitivity of the fibre. In use, therefore, it is an easy task to measure the two optical energy signals passing along the optical fibre 1, and then to obtain a measure of the endface angle of the cleaved end of the fibre by reading off the angle value corresponding to the return loss calculated from the ratio of the measured signals. In practice, an initially calibrated meter 20 would be provided to give a direct reading of endface angle.

In order to maximise the separation between the forward and reflected channels, it is necessary to minimise internal reflections from the waveguide end (most particularly at the waveguide end adjacent detector 6), at the guide/detector 6 mating, and from the detector 6 itself. In this context, it is helpful if the detectors and in particular detector 6, are mated to the waveguide ends with an index matching medium, such as an index matching gel. With the arrangement used to obtain the figures shown in the above table, the maximum channel separation was 21.7 dB, which means that the arrangement was useable to measure cleave angles of up to 2.05 degrees.

It will be apparent that the apparatus described above could be used for assessing cleaved endfaces of optical fibres for both fusion splicing and terminating spare legs of coupler arrays (or indeed for any other purpose which requires measurement of endface angle). In the former case, the operator will be looking for an endface angle close to 0°, and may be instructed to discard any fibre having an endface angle greater than say 1°. In the latter case, the operator will be looking for an endface angle of greater than, say, 5.5°, which would guarantee a return loss of greater than 60 dB, and may be instructed to discard any fibre having a cleave angle which is less than this value. The advantage of tapping and measuring the optical energy passing along the optical fibre in both directions is that the apparatus can be used with any suitable light source without requiring calibration for each such light source. This is because endface angles are compared with return loss, that is to say a parameter dependent upon the ratio of the signal strengths of the optical energy passing along the fibre in both directions.

Obviously, modifications could be made to the apparatus described above. For example, the detector head 4 could be mounted in the cleaving tool clamp, making the device compact and appropriate for field use. In that case, if a calibrated meter is provided, this would be mounted on the cleaving tool.

We claim:

1. Apparatus for measuring the endface angle of a cleaved optical fibre, the apparatus comprising:
    a light source for injecting optical energy into that end of an optical fibre opposite to that whose endface angle is to be measured,
    means for tapping optical energy passing along the optical fibre in both directions,
    means for measuring the signal strength of the optical energy tapped from the optical fibre in both directions, and
    means for converting the ratio of said measured signal strengths into a measure of the endface angle.

2. Apparatus as claimed in claim 1, wherein the tapping means is constituted by a pick-up element defining a curved optical waveguiding path, and clamping means for clamping the optical fibre into a curved position which at least substantially conforms to the inner side of the curved path, such that the optical energy passing along the optical fibre in both directions is tapped into the curved optical waveguiding path.

3. Apparatus as claimed in claim 2, wherein the pick-up element has a curved portion joining two straight portions, the curved portion defining the curved optical waveguiding path, and the straight portions constituting straight waveguiding paths for directing tapped optical energy to said signal strength measuring means.

4. Apparatus as claimed in claim 3, wherein the signal strength measuring means is constituted by first and second photodetectors, the first photodetector being arranged to measure the signal strength of the optical energy tapped from the optical fibre in one direction, and the second photodetector being arranged to measure the signal strength of the optical energy tapped from the optical fibre in the other direction.

5. Apparatus as claimed in claim 4, wherein the first and second photodetectors are positioned at the free ends of the two straight portions of the pick-up element.

6. Apparatus as claimed in claim 1 further comprising means for displaying the measure of the endface angle.

7. Apparatus as claimed in claim 6, wherein the conversion and display means is constituted by a calibrated meter.

8. An endface angle measuring apparatus in combination with a cleaving tool, the endface angle measuring apparatus being as claimed in claim 1, the cleaving tool having a clamp for clamping the optical fibre, and the tapping means and the measuring means being associated with the cleaving tool to form a single constructional unit.

9. A method of measuring the endface angle of a cleaved optical fibre, the method comprising the steps of injecting optical energy into that end of the optical fibre opposite to the cleaved end whose endface angle is to be measured, tapping and measuring the signal strength of optical energy passing along the optical fibre towards said cleaved end, tapping and measuring the signal strength of optical energy passing along the optical fibre away from said cleaved end and after reflection at its endface, and comparing the ratio of the said measured signals to provide a measure of the endface angle.

10. A method as claimed in claim 9, further comprising the steps of converting the ratio of said measured signal strengths into a measure of the endface angle, and of displaying the measure of the endface angle.

* * * * *